United States Patent [19]
Miller et al.

[11] Patent Number: 5,640,569
[45] Date of Patent: Jun. 17, 1997

[54] DIVERSE GOODS ARBITRATION SYSTEM AND METHOD FOR ALLOCATING RESOURCES IN A DISTRIBUTED COMPUTER SYSTEM

[75] Inventors: Mark S. Miller; E. Dean Tribble, both of Los Altos; Norman Hardy, Portola Valley; Christopher T. Hibbert, Mountain View, all of Calif.

[73] Assignee: Sun Microsystems, Inc., Mountain View, Calif.

[21] Appl. No.: 431,021

[22] Filed: Apr. 28, 1995

[51] Int. Cl.$^6$ .......................... G06F 13/366; G06F 15/76
[52] U.S. Cl. ............................................. 395/729; 395/237
[58] Field of Search ................................. 395/729, 208, 395/237, 650

[56] References Cited

U.S. PATENT DOCUMENTS

| | | | |
|---|---|---|---|
| 4,789,928 | 12/1988 | Fujisaki | 395/237 |
| 5,243,515 | 9/1993 | Lee | 395/237 |
| 5,394,324 | 2/1995 | Clearwater | 395/237 |
| 5,487,168 | 1/1996 | Geiner et al. | 395/208 |

OTHER PUBLICATIONS

"An Algorithm for Optimal Service Provisioning Using Resource" Steven Low et al., IEEE 1994.

Post et al., "Application of Auctions as a Pricing Mechanism for the Interchange of Electric Power", IEEE Transactions on PWR System, vol. 10, No. 3, Aug. 1995.

Lee, "Electronic Brokerage and Electronic Auction: The Impact of IT on Market Structure", IEEE 1996.

M. Anderson, R.D. Pose, C.S. Wallace, "A Password–Capability System", The Computer Journal, vol. 29, No. 1, 1986, pp. 1–8.

Mark S. Miller, K. Eric Drexler, "Comparative Ecology: A Computational Perspective", The In The Ecology of Computation, Bernardo Huberman (ed.) Elsevier Science Publishers/North–Holland, 1988, pp. 1–26.

Mark S. Miller, K. Eric Drexler, "Markets and Computation: Agoric Open Systems", In The Ecology of Computation, Bernardo Huberman (ed.) Elsevier Science Publishers/North–Holland, 1988, pp. 1–44.

K. Eric Drexler, Mark S. Miller, "Incentive Engineering: for Computational Resource Management", In The Ecology of Computation, Bernardo Huberman (ed.) Elsevier Science Publishers/North–Holland, 1988, pp. 1–36.

(List continued on next page.)

*Primary Examiner*—Gopal C. Ray
*Assistant Examiner*—Xuong M. Chung-Trans
*Attorney, Agent, or Firm*—Gary S. Williams; Flehr Hohbach Test Albritton & Herbert LLP

[57] ABSTRACT

A diverse goods arbitration system and method allocates computer resources among bidding requesters. Bid slates are transmitted to an arbiter by users (requesters) requesting use of specified portions of the available computer resources. Each bid slate may contain a plurality of bids, each bid representing a requested set of resources and a bid price. The arbiter selects combinations of bids from the bid slates, where each bid combination consists of no more than one bid from each of the received bid slates. The arbiter rejects all bid combinations whose constituent bids exceed an established maximum allocation level for any computer resource. It then selects as a winning bid combination the bid combination having the highest total bid price. Computer resources are then allocated for a next time period based on the winning bid. Costs are allocating to each successful requester in accordance with a predefined opportunity cost function. In particular, for each successful requester, the arbitration process is repeated while excluding that successful requester's bid slate from the set of bid slates considered, resulting in the selection of a second winning bid that excludes the successful requester. The successful requester is then assessed a cost corresponding to the difference between the winning bid's total bid prices, excluding the price in the successful requester's granted bid, and the total bid prices associated with the second winning bid.

8 Claims, 4 Drawing Sheets

OTHER PUBLICATIONS

C.S. Wallace, R.D. Pose, "Charging in a Secure Environment", Bremen, FRG., May 1990, pp. 24-1 through 24-11.

Michael P. Wellman, "A Market-Oriented Programming Environment and its Application to Distributed Multicommodity Flow Problems", AI Access Foundation and Morgan Kaufmann Publishers, Aug. 1993, pp. 1-23.

DIVERSE GOODS ARBITRATION SYSTEM AND METHOD FOR ALLOCATING RESOURCES IN A DISTRIBUTED COMPUTER SYSTEM

The present invention relates generally to multiprocessor computer systems, distributed computer systems and networks of interconnected computer systems, and particularly to a system and method for allocating resources among computer system users competing for those resources using a technique herein called diverse goods arbitration.

BACKGROUND OF THE INVENTION

The cheaper a resource becomes, the more important it becomes to have automatic management of that resource in a principled fashion. This is because the increased capacity makes it possible to apply that resource to lower-value uses. When a resource is expensive, all uses, in order to be worth the amount they consume, must exceed some minimum value to their users, so all uses of an expensive resource have high and comparable values. Also, because individual uses of an expensive resource have high value, it is both easy and worthwhile to manage the resource manually. When the price per unit of that resource drops by multiple orders of magnitude, uses that have a low value per resource unit become feasible, but these low-value uses can crowd out the high-value uses if there is no way to express the value differences—and manual management of the resource becomes prohibitively difficult, as well as expensive relative to the value of the resource.

For example, the transition to fiber data communication makes possible bandwidth-intensive applications like video. It might seem, since fiber has so much more bandwidth than previous communications media, that existing network allocation policies (like those used in Ethernet) can simply be scaled. However, in the case of Ethernet, the amount of bandwidth that an application is allocated is proportional to how much it asks for and how often it asks. In such a regime, network users trying to transmit, for example, electronic mail may find network performance significantly reduced by the presence of video users, even though both the data users and video users would agree that the value per bit of electronic mail is far higher than that of video data: a megabyte of capacity would carry an entire day's correspondence for a large company, but amount to only a single frame of high-resolution video, which the video user could drop without noticing. Expanding the overall capacity of the network will not address the problem, because the higher capacity of the network invites still more video use. Non-agoric protocols provide no way to express this value difference. Thus, economic abstractions, such as price and value, meaningful to the system and automatically taken into account, are needed in order to manage abundant computing resources.

The primary existing resource allocation methods for allocating a computer system resource are: (1) first come first served, (2) priority based allocation methods, (3) pro rata allocation methods (allocate in proportion to amount requested), and (4) simple "single good" auction methods. In "first come first served" systems, bandwidth is assigned in the order that requests are made, until there is insufficient bandwidth left to satisfy further requests, at which point the requests that cannot be satisfied are simply denied. In priority based allocation methods, higher priority requests displace lower priority requests when there is insufficient bandwidth to satisfy all requests.

For systems having a single allocatable system resource (such as bandwidth on a transmission medium) and many requesters, such as the system shown in FIG. 1, the prior art literature discloses a technique that will for the purposes of this document be called "single good auctions." In a single good auction, each requester specifies the amount of the good being requested, and a bid price that the requester is willing to pay. The arbiter (sometimes called the auctioneer) selects the set of bids that maximize the payment received, and each successful requester whose request is granted pays the amount that the requester bid.

There are several different ways in which such single good auctions can be conducted. Conventional auction techniques include the English auction, also known as the first-price, open-bid auction, in which the highest price bid is the price paid and every bidder knows the bids made by others. Another auction mechanism is the Dutch auction, in which a seller offers lower and lower prices until a buyer or set of buyers claims the item at the last offered price. In a double auction, sellers offer lower and lower prices while buyers offer higher and higher prices until they meet. In a first-price sealed-bid auction, fixed bids are submitted and the highest is accepted. In a second-price sealed-bid auction, the highest bid is accepted, but the highest bidder pays the amount bid by the second-highest bidder.

While the prior art has provided many well proven systems for allocating a single resource through various auction and arbitration systems, those systems are not appropriate for the simultaneous arbitration of multiple goods, or "baskets of goods," where the goods being allocated are relatively inexpensive and in such great supply that the requests of numerous requesters can be satisfied simultaneously. For instance, one might think that each of the goods could be allocated separately through a separate arbitration, using one of the known arbitration mechanisms. However, the inadequacy of separate arbitrations is demonstrated as follows. A user who requests 8 Mb/sec of bandwidth on three sequentially connected links needs to be allocated exactly the same amount of bandwidth on all three links, or none at all. Allocating this user 8 Mb/sec of bandwidth on two of the links and none on the third link is of zero value to the user, because without a bandwidth allocation on the third link he will receive no signals whatsoever.

Thus, it is an object of the present invention to provide a diverse goods arbitration mechanism that preserves the integrity of each diverse goods bid and either allocates all the goods in a bid, in the quantities requested, or denies the bid.

Another object of the present invention is to provide an efficient and fair system and method for allocating a plurality of computer resources in an integrated arbitration, and for allocating costs to the successful requesters in accordance with the opportunity costs associated with each successful request for computer resources.

SUMMARY OF THE INVENTION

In summary, the present invention is a diverse goods arbitration system and method for allocating computer resources among bidding requesters. The present invention's arbitration methodology uses a variant of the second-price sealed-bid auction. This arbitration mechanism is efficient in that each good is sold or allocated to the right buyer and the right price. Note that the goal of the arbitration mechanism is not to maximum monetary return to the arbiter, but rather to allocate resources to maximum declared value. Successful requesters are charged based on opportunity costs, which best reflects the economic cost of allocating system resources to each successful requester.

In accordance with the present invention, bid slates are transmitted to an arbiter by users (requesters) requesting use of specified portions of the available computer resources. Each bid slate may contain a plurality of bids, each bid representing a requested set of resources and a bid price.

The arbiter stores data representing a maximum allocation level for each computer resource and stores additional data representing bid slates it receives from the requesters. The arbiter selects combinations of bids from the bid slates, where each bid combination consists of no more than one bid from each of the received bid slates. The arbiter rejects all bid combinations whose constituent bids exceed the maximum allocation level of any computer resource. From among the non-rejected bid combinations, it then selects as a winning bid combination the bid combination having the highest total bid price. Computer resources are then allocated for a next time period based on the winning bid.

Costs are allocating to each successful requester in accordance with a predefined opportunity cost function. In particular, for each successful requester, the arbitration process is repeated while excluding that successful requester's bid slate from the set of bid slates used, resulting in the selection of a second winning bid that excludes the successful requester. The successful requester is then assessed a cost corresponding to the difference between the winning bid's total bid prices, excluding the price bid by the successful requester, and the total bid prices associated with the second winning bid.

In a preferred embodiment, the computer resources being allocated by the arbiter are the transmission bandwidth of a multiplicity of network links interconnecting the users with one or more video servers as well as an electronic mail or file server.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
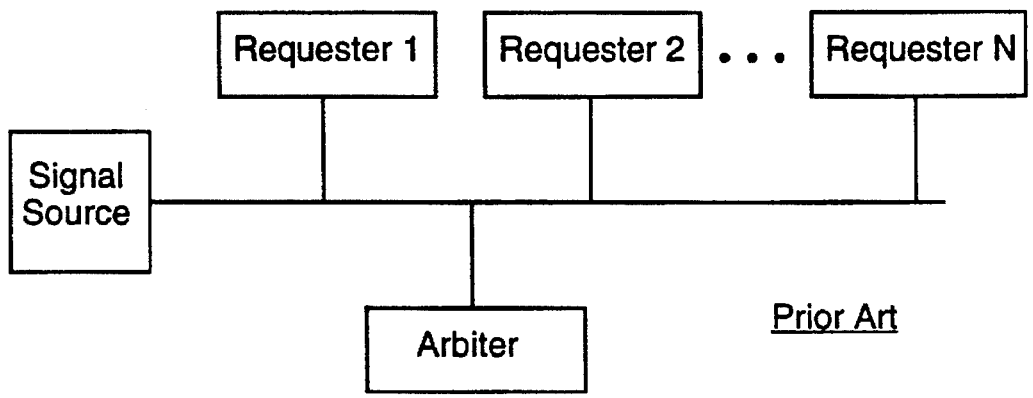
FIG. 1 is a block diagram of an Ethernet style prior art system.
Figure 2:
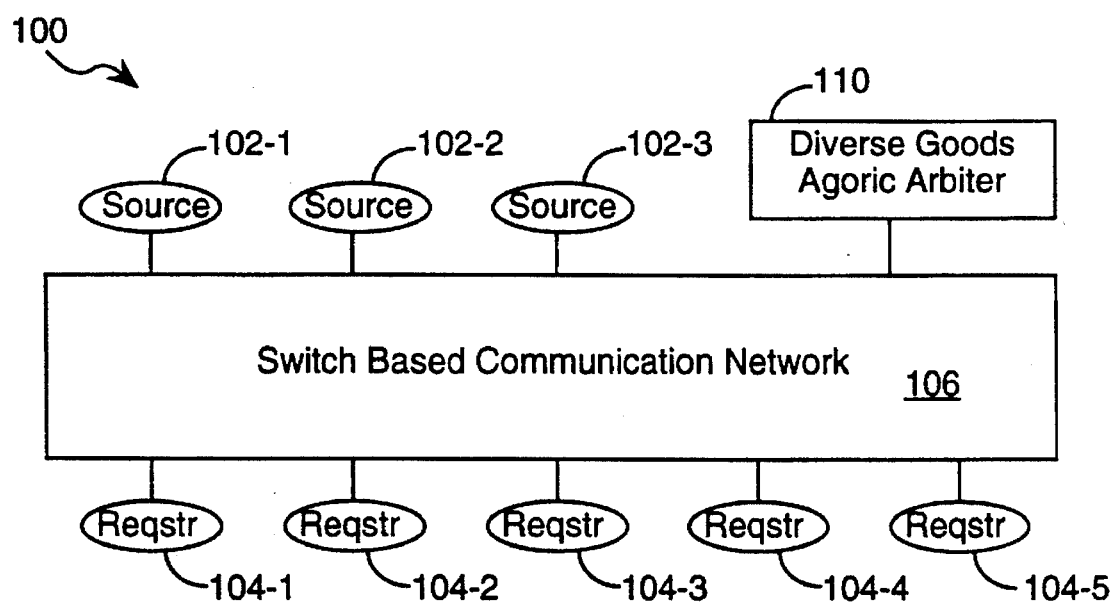
FIG. 2 is a block diagram of a switch based communication network utilizing a diverse goods agoric arbiter.

Referring to FIG. 2, a typical system in which the present invention is used is a distributed computer system 100 having multiple signal sources 102, numerous subscribers (sometimes called users or requesters) 104, and a switch based communication network 106 that interconnects them. In the preferred embodiment, the signal sources 102 include video servers and electronic mail servers.

Bandwidth allocation requests made by the subscribers 104 constitute competing requests for multiple goods because the available bandwidth on each network link represents a distinct and separate good. The requests made will typically include bandwidth requests for communication paths that are at least partially overlapping.

The term "agoric" is used in this document to mean "utilizing market mechanisms, such as auctions, for resource allocation in computer systems."

The diverse goods agoric arbiter 110 receives bandwidth allocation requests from subscribers 104. The arbiter 110 then selects a combination of bids, called the winning bid combination, that maximizes the total bid price for all the winning bids, while not violating any established maximum resource allocation levels. The arbiter then transmits resource grant messages that allocate system resources in accordance with the winning bid combination.

The resource allocation process performed by the arbiter is implemented as a continuing arbitration process. The resource allocations resulting from an arbitration are maintained if no new bids have been received, no continuing bids have been withdrawn, and there has been no change in the network configuration. Whenever at least one new bid is received, any continuing bids is withdrawn, or there has been a change in the network configuration, the arbitration procedure is re-executed. More particularly, each arbitration cycle results in a resource allocation for a fixed period of time, such as 0.5 seconds. Every time period, the arbiter 110 re-executes the arbitration procedure if there are any new requests, any previously pending requests have been withdrawn, or there has been a network configuration change. Otherwise the previous resource allocation is maintained.

Figure 3:
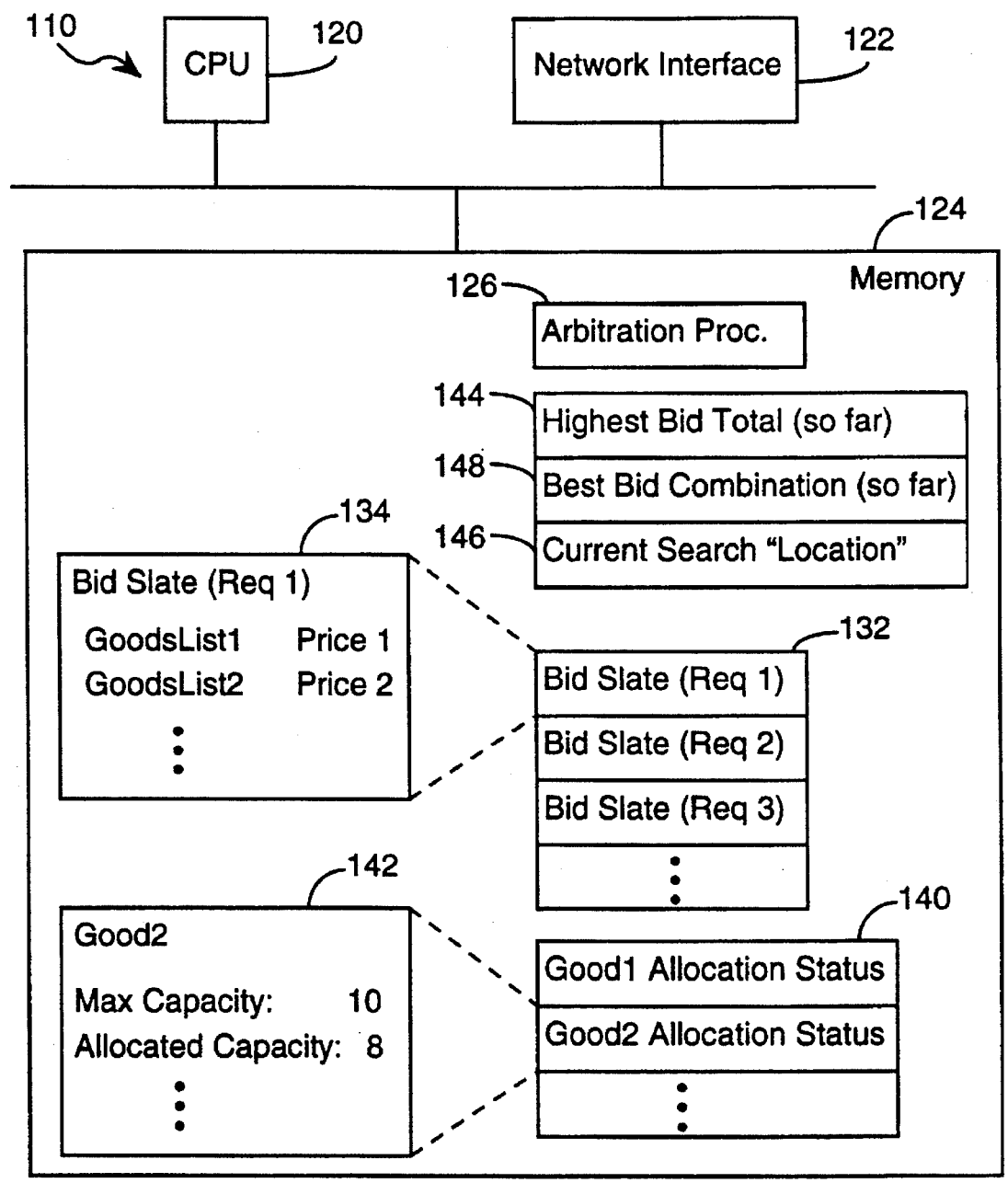
FIG. 3 is a block diagram of an arbiter in accordance with a preferred embodiment of the present invention.

Referring to FIG. 3, the arbiter 110 in the preferred embodiment includes a central processing unit (CPU) 120, a network interface 122 for receiving bid slates from network subscribers, and local memory 124. The local memory 124 stores the arbitration procedure 130 that implements the methodology of the present invention, an array of data 132 representing the bid slates 134 received from subscribers and another array of data 140 representing the allocation status of each allocatable computer resource. Array 140 includes an allocation record 142 for each allocatable resource indicating the maximum allocation level for the corresponding resource and the amount of the resource allocated by the currently selected bid combination.

In addition, local memory 124 is also used to store a highest total bid price 144, representing the total bid value of the best bid found so far, a current bid position vector 146, representing a currently selected bid combination, and a best bid combination vector 148, representing the best bid combination found so far during the arbitration process.

Bids for allocation of resources are submitted by subscribers to the arbiter in the form of "bid slates." Each bid slate 134 identifies the requester, and contains a sequence of one or more bids. Each bid in the bid slate includes a specification of a requested combination of goods, and an associated bid price. For instance, a bid might include quantity QA for good A, quantity QB for good B and so on. By allowing each subscriber to submit a bid slate having multiple bids, the subscriber can indicate that while a first resource allocation combination would be most valuable to the subscriber, other resource allocation combinations would be of somewhat less value to the subscriber. For instance, the subscriber might be willing to pay $5 per hour for full bandwidth video channel, but only $2 per hour for a compressed bandwidth video channel. Each such "channel" will typically be represented by a combination of bandwidth allocations on a number of network links.

Figure 4:
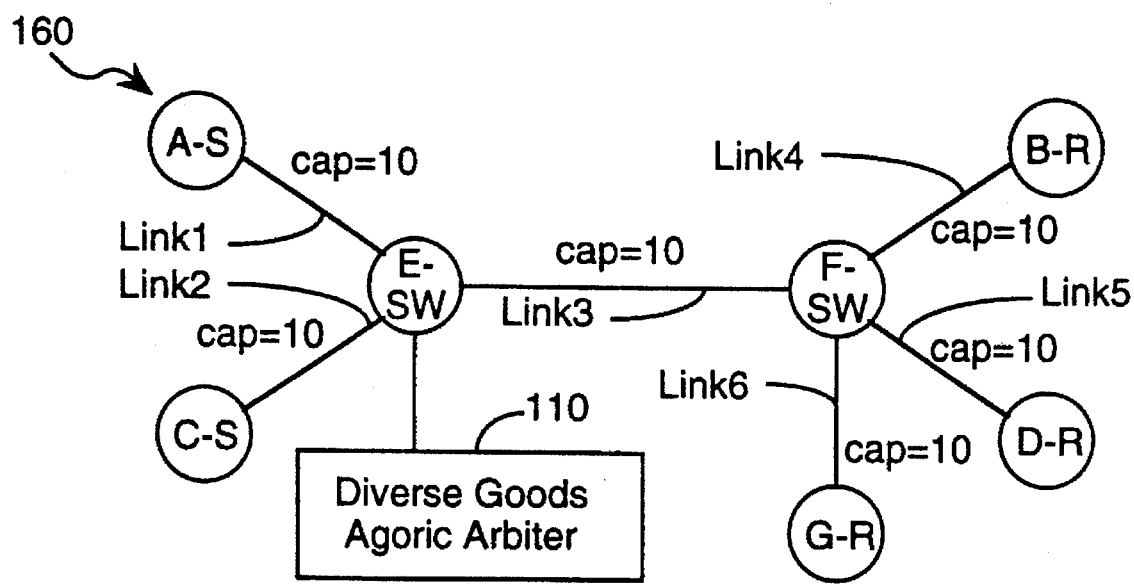
FIG. 4 schematically represents a simple distributed computer system having a switch based communication network utilizing a diverse goods agoric arbiter.

The simplified distributed computer system 160 shown in FIG. 4 will be used to demonstrate operation of the present invention. This distribute computed system has a switch based communication network and a diverse goods agoric arbiter 110. In this system, there are two signal sources, A-S and C-S, and three subscribers who can submit resource allocation requests, B-R, D-R and G-R. The simplified network has just two switches, E-SW and F-SW, and six communication links, Link1 through Link6. The signal sources A-S and C-S are video servers with multiple levels of service. Programs and connections to the video servers can be provided at multiple bandwidths and quality levels. In addition, for purposes of this explanation of the invention we will assume that signal source A-S also functions as an electronic mail server, as well as a video server.

For simplicity, it will be assumed that the maximum allowed allocation for each individual link (Link1-Link6) is 10 "units," as 10 megabytes per second of bandwidth.

Figure 5:
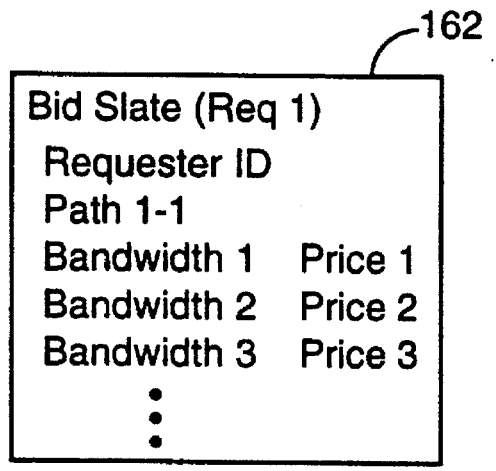
FIG. 5 depicts a bid slate used in a preferred embodiment.

In the simplified system of FIG. 4, a somewhat modified Bid Slate format is used, as shown in FIG. 5. In particular, each bid slate 162 used in the system of FIG. 4 includes a representation of the requester's identification, a signal path indicator, followed by two or more "bandwidth, price" pairs. Rather than representing a basket of goods in each bid record, the basket of goods for each bid is represented by a combination of the path indicator and the bandwidth parameter. For instance, in the following bid slate subscriber B is requesting a communication connection from node A to node B at three bandwidth levels: 0 Mb/sec, 8 Mb/sec and 5 Mb/sec.

| BID SLATE | |
|---|---|
| Requester: B | |
| Path: A to B | |
| Bid 1: 0 | 0 |
| Bid 2: 8 | 5 |
| Bid 3: 5 | 2 |

Thus, the second bid in this exemplary bid slate represents a request for 8 Mb/sec of bandwidth on links 1, 3 and 4, and thus represents a request for specific quantities of three goods, at a bid price of 5 monetary units per unit of time (e.g., 5 dollars per hour).

For purposes of explanation, in the system of FIG. 4 we will assume that all goods requests are stated in units of megabytes of bandwidth per second, and that all bid prices are rates of payment amount per time period, and in particular dollars per hour. In other embodiments of the invention, the computer resources to be allocated might include memory resources as well as link bandwidth resources and perhaps other resources as well (e.g., computation time on a compute server).

Also, for purpose of this explanation, requests will be considered to be continuing requests until withdrawn. Bids are retained and used in all resource allocation arbitrations until withdrawn. Arbitrations are held only when new requests are received, when any previously received request is withdrawn, or if the set of available computer resources changes.

Figure 6:
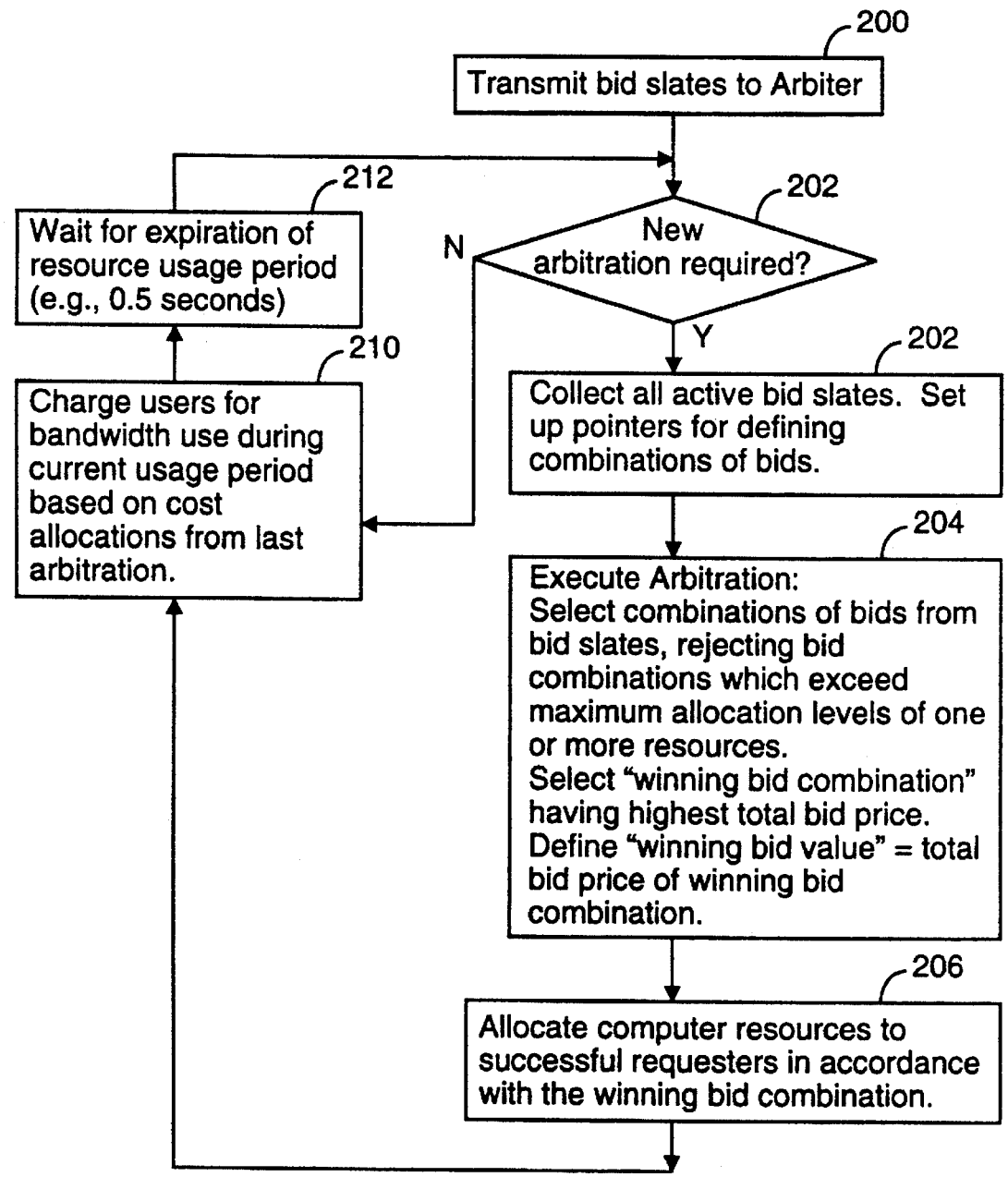
FIG. 6 is a flow chart of the arbitration method employed by a preferred embodiment of the present invention.

The arbitration procedure used in the preferred embodiment will be explained with reference to the flow chart in FIG. 6 and a pseudocode representation of the procedure in Table 1. The pseudocode used in Table 1 is, essentially, a computer language using universal computer language conventions. While the pseudocode employed here has been invented solely for the purposes of this description, it is designed to be easily understandable by any computer programmer skilled in the art.

The first step (200) of the arbitration process is for the arbiter to receive bid slates that have been transmitted by requesters, to determine if any previously submitted bids have been withdrawn, and to construct a data structure 132 in local memory representing all the pending bid slates.

If no new bid slates have been received since the last arbitration, and no continuing bids have been withdrawn (202), the resource allocations from the prior arbitration are maintained for an additional resource allocation period and the users of those allocated resources are charged for one more usage period in accordance with the charge rates determined during the last arbitration (210, 212).

If at least one new bid slate has been received, or at least one bid slate has been withdrawn (202), or the network configuration has changed, a special bid combination pointer vector 146 (see FIG. 3) is defined. In one preferred embodiment, this pointer vector 146 is implemented as an "N stage counter."

The purpose of the bid combination pointer vector is to point, in sequence, to every possible combination of bids. Each bid combination in the preferred embodiment includes one bid from each pending bid slate. This simplified bid combination point vector structure is made possible because each bid slate 162 includes a zero bid for no resources. It is not necessary for the requesters to include a zero bid in their transmitted bid slates; a zero bid is added by the arbiter if one was not included by the requester.

Each stage of the N stage counter references one bid in the corresponding bid slate. For instance, if there are three pending bid slates, the first two of which include three bids each and the last of which includes two bids, then the N stage counter will have three stages. The first two stages of the 3 stage counter will increment from 0 to 1 to 2 before cycling back to zero, while the last stage will increment from 0 to 1 before cycling back to zero. Thus, in essence, the N stage counter is implemented as a set of N counters connected in tandem: as each counter is incremented, it causes the next higher order counter to increment only when it cycles back to a value of zero. Each stage of the counter can have a different maximum value, depending on the number of bids in the corresponding bid slate.

The arbitration process (204) for selecting a winning bid combination is performed as follows. Starting with an N stage counter value of zero, every possible bid combination, or at least a substantial subset of the possible bid combinations, is evaluated in two respects. In particular, for each bid combination to be evaluated, a total resource allocation request value is generated for all of the allocatable goods, with the computed values being stored in their respective positions in the goods allocation array 140. If the total resource allocation request value for any good exceeds the maximum allowed allocation of that good, the corresponding bid combination is rejected. If the bid combination is not rejected, the total bid price for the bid combination is computed and compared with the highest bid total (144) of any bid combination evaluated so far. If the current bid combination's total bid price exceeds the previous highest bid total, the current bid combination is stored as the best bid combination (so far) (148) and the highest bid total (144) is updated to represent the current bid combination's total bid price.

This process is repeated for either all possible values of the N stage counter, or a selected subset of the possible values. In many circumstances, an evaluation of the bid slates and the extents to which the resources they are requesting overlap will allow the "search tree" of bid combinations to be substantially pruned, thereby reducing the amount of computation performed by the arbiter. For instance, in many circumstances, once certain bid combinations have been determined to violate certain maximum resource allocation levels, other bid combinations with even higher resource allocation requests do not need to be explicitly evaluated since it is known in advance that they will also violated the same maximum resource allocation levels. In another example, the bids within the bid slates may be re-arranged so that bid combinations can be evaluated in decreasing order of total bid price, such that once a bid combination is found that does not violate any resource allocation limits, that bid combination is used as the winning bid combination without further analysis of any further bid combinations.

Once the bid combinations have been evaluated, the best bid combination vector 148 represents the winning bid combination.

For each non-zero bid in the winning bid combination, the arbiter next computes an opportunity cost which will be charged to the corresponding requester for each usage period. Each non-zero bid in the winning bid combination is considered to be a "granted request." For purposes of explaining the computation of each winning bid's associated opportunity cost, we will assume that there are M such granted requests.

For each of the M granted requests (where M≦N) the arbitration procedure is re-executed. Each time the arbitration procedure is re-executed, the bid slate of one of the winning requesters is excluded from the arbitration. The winning requester is charged a price proportional to the difference between the value of the winning bid combination for the reduced requester arbitration and the value of the winning bid combination for the full arbitration, excluding the price in the successful requester's granted bid:

Opportunity Cost (Successful requester i)
= (Reduced Arbitration Total Bid Price)
 - (Full Arbitration Total Bid Price
   - Successful requester i's Winning Bid Price)
Cost per Resource Usage Period
= β × Opportunity Cost (Successful requester i)

The opportunity cost for each successful requester will range between zero, and the full bid price in the successful requester's winning bid. This can be seen from the following simple analysis. First, if removal of the successful requester's slate from the arbitration does not change of any of the other winning bids, the successful requester's request has not caused anyone else's bid to be rejected or reduced. Thus, the opportunity cost for the successful requester in this circumstance is zero.

Second, the reduced arbitration cannot produce a new total bid price greater than the total bid price of the full arbitration. If the reduced arbitration produces a total bid price equal to the total bid price of the full arbitration, which is the worst case scenario, the opportunity cost associated with the successful requester is his/her full bid price, since his/her bid has resulted in reduced allocations to others have a value equal to his/her full bid price.

Except in certain special cases, such as where all maximum bids are included in the winning bid combination (and thus the opportunity cost is zero for all successful requesters), the analysis of the opportunity cost must be performed separately for each successful requester.

Once the winning bid combination, and the associated opportunity costs, have been determined by the arbiter, the arbiter transmits resource allocation messages for allocating system resources in accordance with the winning bid combination and for charging the successful requesters in accordance with the determined opportunity costs. In particular, for each non-zero bid in the winning bid combination, the arbiter transmits a resource grant message to the winning requester and debits a resource account for the winning requester for each resource usage period by an amount corresponding to the computed opportunity cost. As shown above, the cost per resource usage period is determined by multiplying the computed opportunity cost by a time factor β. For instance, if opportunity costs are determined on a usage per hour basis, and the resource usage period is 0.5 seconds, then the computed opportunity costs for each successful requester are each divided by 7200 to determine the allocated cost per resource usage period.

DIVERSE GOODS ARBITRATION EXAMPLE

Referring to FIGS. 4 and 5, for purpose of demonstrating the operation of the invention, we will assume that three bids slates have been submitted:

| Bid Slate 1 | Bid Slate 2 | Bid Slate 3 |
|---|---|---|
| Requester: B | Requester: D | Requester: G |
| Path A-B | Path C-D | Path A-G |
| Bid 0: 0 0 | Bid 0: 0 0 | Bid 0: 0 0 |
| Bid 1: 8 7 | Bid 1: 6 4 | Bid 1: 1 3 |
| Bid 2: 3 2 | Bid 2: 3 2 | |

Bid slates 1 and 2 are requests for video connections, each at two distinct bandwidth/quality levels, while Bid slate 3 is for a file transfer or electronic mail connection. Note that in this arbitration, the allocations of six goods are being arbitrated simultaneously: the bandwidth allocations of Link1, Link2 . . . , Link6. In this particular example, two of the link bandwidths (for Link1 and Link3) are the subject of competing bids. In more realistic commercial settings, many links will typically be the subject of competing bids during heavy usage periods.

The preferred embodiment of the arbitration procedure evaluates all possible bid combinations, as follows:

| 3-Stage Counter Value | Violates Max? | Total Bid Price |
|---|---|---|
| 000 | No | 0 |
| 001 | No | 3 |
| 010 | No | 4 |
| 011 | No | 7 |
| 100 | No | 7 |
| 101 | No | 10 |
| 110 | Yes | — |
| 111 | Yes | — |
| 120 | Yes | — |
| 121 | Yes | — |
| 200 | No | 2 |
| 201 | No | 3 |
| 210 | No | 6 |
| 211 | No | 9 |
| 220 | No | 4 |
| 221 | No | 7 |

Thus, the winning bid combination is bid 1 from bid slate 1 and bid 1 from bid slate 3, having a total bid price of 10.

The opportunity costs for successful requesters B and G are determined as follows. To determine the opportunity cost associated with requester B's successful request, the arbitration is re-executed without bid slate 1. This results in a second winning bid of bid 1 from bid slate 2 and bid 1 from bid slate 3, with a total bid price of 7. As a result the opportunity cost to successful requester B is:

$$\text{Opportunity Cost}(B) = 7 - (10-7) = 4$$

The result, 4, makes intuitive sense in that the second arbitration had a total bid price 3 units less than in the full arbitration, meaning that 3 units of B's success request price of 7 did not represent a opportunity cost.

The same procedure is next applied to determine the opportunity cost associated with requester G's successful request, but re-executing the arbitration without bid slate 3. This results in a second winning bid of bid 1 from bid slate 1, with a total bid price of 7. As a result the opportunity cost to successful requester G is:

$$\text{Opportunity Cost}(G) = 3 - (10-7) = 0$$

The result, 0, makes intuitive sense because the second arbitration produces the exact same result as the full arbitration, except for requester G's bid. This means that there was no opportunity cost associated with G's successful request.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

Pseudocode Representation of Diverse Goods Agoric Arbitration procedure

```
Repeat Forever
{
If no new bids have been received, no continuing bids have been withdrawn,
    and there has been no change In the network configuration
    {
    Charge successful requesters from prior arbitration for one usage
        period
    Wait for expiration of resource usage period
    }
Else
    {
    Initialize N stage counter to zero
    Initialize best bid vector and best bid value to zero
    Do Until N Stage Counter reaches final value
        {
        If corresponding bid violates none of the bandwidth constraints
            {
            Determine value of corresponding bid
            If determined value > best bid value
                Best bid value = determined value
                Best bid vector = bid vector corresponding to current
                    value of N Stage Counter
            }
        }
    /* End Do Loop */
    Initialize Opportunity Costs for all requesters (i=1 to N) to zero
    M = number of requests that were Granted
    WR(1:M) = vector identifying the M requesters whose bids were
        granted
        WB(1:M) = vector identifying the M winning bids
        If Best Bid Vector = Maximum value of N Stage Counter
        Return      /* Opportunity Cost for all bidders is zero when all
                    bidders were granted their highest bandwidth request */
    Do for i = 1 to M
        {
        ReRun Arbitration(i,j) /* Arbitration excludes requester WR(i) */
            /* j = best bid value for rerun arbitration */
        /*  If vector of granted requests is the same as the Best Bid
                Vector, except for W(i), OpportunityCost(i) = 0 */
        OpportunityCost(i) = j - (Best Bid Value - WB(i).BidPrice )
        }
    /* End Do Loop */
    Transmit resource allocation messages for allocating system resources
        in accordance with the winning bid combination.
    Charge each of the successful requesters a price proportional to the
        computed OpportunityCost for that bidder for each resource
        allocation period that the resource allocation is maintained.
    Wait for expiration of resource usage period.
    }
}
```

What is claimed is:

1. A method of allocating a plurality of computer resources among a plurality of users, comprising the steps of:

(A) transmitting to an arbiter bid slates from ones of said users (requesters) requesting use of specified portions of said computer resources, at least a plurality of said bid slates including a plurality of bids, each bid in each bid slate representing a requested set of resources, composing a specified subset of said plurality of computer resources, and a bid price;

(B) at said arbiter:
- (B1) storing data representing a maximum allocation level for each of said plurality of computer resources,
- (B2) receiving said bid slates;
- (B3) selecting for analysis combinations of bids from said bid slates, where each bid combination consists of no more than one bid from each of said received bid slates, rejecting all those of said bid combinations whose constituent bids include requests for one or more of said computers resources in excess of the corresponding maximum allocation levels for those computer resources, and selecting as a winning bid combination one non-rejected bid combination that includes bids which place highest value on use of said plurality of computer resources;
- (B4) allocating to each successful requester having a non-zero bid included in said winning bid combination a cost in accordance with a predefined opportunity cost function; and (C) allocating said computer resources among said successful requesters in accordance with said winning bid.

2. The method of claim 1 including,
at said arbiter:
- (B5) defining a winning bid value as the total bid price of the bids in said winning bid combination; and
- (B6) for each successful requester:
  - (B6A) performing said selecting step an additional time while excluding said each successful requester's bid slate from the set of bid slates used to form a test set of bid combinations to select a second winning bid that excludes said each successful requester; and
  - (B6B) allocated to said each successful requester a cost corresponding to the difference between said winning bid value and the total bid prices associated with said second winning bid.

3. The method of claim 1, wherein said plurality of computer resources includes transmission bandwidth on a multiplicity of network links interconnecting said users.

4. The method of claim 1, wherein
said plurality of computer resources includes transmission bandwidth on a multiplicity of network links interconnecting said users and at least one video server;
said transmitted bid slates include a first and second bids in a first bid slate where said requested set of resources are first and second bandwidth allocation requests on a plurality of said network links, both sufficient for real time transmission of a motion picture video program, and having a first and second bid price, respectively, a third bid in another bid slate where said requested set of resources is a third bandwidth allocation request on a plurality of said network links that is insufficient for real time transmission of a motion picture video program, having a third bid price;
said first, second and third bandwidth allocation requests overlap on at least one network link;
said first bandwidth allocation is greater than said second bandwidth allocation and said second bandwidth allocation is greater than said third bandwidth allocation;
said bid prices each represent a value for use of the requested bandwidth allocation for a period of time of less than 5 seconds duration, and wherein said third bid price is greater than said second bid price; and
said winning bid combination selected at said arbiter includes said third bid in said winning combination whenever said first bid is included in said winning combination.

5. An arbiter for allocating a plurality of computer resources among a plurality of users, comprising:
a receiver for receiving bid slates from ones of said users (requesters) requesting use of specified portions of said computer resources, at least a plurality of said bid slates including a plurality of bids, each bid in each bid slate representing a requested set of resources, composing a specified subset of said plurality of computer resources, and a bid price;
arbitration apparatus, including:
  memory for storing data representing a maximum allocation level for each of said plurality of computer resources and for storing said received bid slates;
  bid selection means for selecting combinations of bids from said bid slates, where each bid combination consists of no more than one bid from each of said received bid slates, rejecting all those of said bid combinations whose constituent bids include requests for one or more of said computers resources in excess of the corresponding maximum allocation levels for those computer resources, and selecting as a winning bid combination one non-rejected bid combination that includes bids which place highest value on use of said plurality of computer resources; and
  cost allocation means for allocating to each successful requester having a non-zero bid included in said winning bid combination a cost in accordance with a predefined opportunity cost function; and
a transmitter for transmitting one or messages that allocate said computer resources among said successful requesters in accordance with said winning bid.

6. The arbiter of claim 5,
said bid selection means defining a winning bid value as the total bid price of the bids in said winning bid combination; and
said cost allocation means including means for allocating a cost to each successful requester by:
  performing said selecting step an additional time while excluding said each successful requester's bid slate from the set of bid slates used to form a test set of bid combinations to select a second winning bid that excludes said each successful requester; and
  allocated to said each successful requester a cost corresponding to the difference between said winning bid value and the total bid prices associated with said second winning bid.

7. The arbiter of claim 5, wherein said plurality of computer resources includes transmission bandwidth on a multiplicity of network links interconnecting said users.

8. The arbiter of claim 5, wherein
said plurality of computer resources includes transmission bandwidth on a multiplicity of network links interconnecting said users and at least one video server;
said transmitted bid slates include a first and second bids in a first bid slate where said requested set of resources are first and second bandwidth allocation requests on a plurality of said network links, both sufficient for real time transmission of a motion picture video program, and having a first and second bid price, respectively, a third bid in another bid slate where said requested set of resources is a third bandwidth allocation request on a plurality of said network links that is insufficient for real time transmission of a motion picture video program, having a third bid price;

said first, second and third bandwidth allocation requests overlap on at least one network link;

said first bandwidth allocation is greater than said second bandwidth allocation and said second bandwidth allocation is greater than said third bandwidth allocation;

said bid prices each represent a value for use of the requested bandwidth allocation for a period of time of less than 5 seconds duration, and wherein said third bid price is greater than said second bid price; and said winning bid combination selected by said bid selection means includes said third bid in said winning combination whenever said first bid is included in said winning combination.

* * * * *